Patented July 7, 1953

2,644,838

UNITED STATES PATENT OFFICE 2,644,838

PRODUCTION OF NITROMALONIC ESTERS

David I. Weisblat and Douglas A. Lyttle, Kalamazoo, Mich., assignors to The Upjohn Company, Kalamazoo, Mich., a corporation of Michigan No Drawing. Application July 28, 1950,
Serial No. 176,546

4 Claims. (Cl. 260—485)

This invention relates to an improvement in the nitration of dialkyl esters of malonic acid with fuming nitric acid whereby improved yields of dialkyl nitromalonates are obtained. More specifically, this invention relates to a method for the nitration of dialkyl esters of malonic acid wherein the nitration is carried out at temperatures between fifteen degrees centigrade and fifty degrees centigrade for a period of between fifty minutes and four hours, the length of the reaction time varying inversely with the temperature.

Esters of nitromalonic acid have been found to be of great value in the preparation of amino acids as disclosed in our copending application, Serial No. 777,584, filed October 2, 1947, now Patent 2,528,928. As disclosed in this copending application, tryptophane may be prepared from esters of nitromalonic acid by the following series of reactions: Gramine is condensed with a dialkyl nitromalonate to yield a dialkyl alpha-(3-indolemethyl) - alpha - nitromalonate, which upon decarbalkoxylation, reduction and hydrolysis produces alpha - amino - beta - (3 - indole) - propionic acid (tryptophane).

The dimethyl ester of malonic acid has been nitrated by adding fuming nitric acid to the ester at a temperature of about zero degrees centigrade. The best known procedure of the prior art is that of Arndt and Rose (J. Chem. Soc. 1935, page 1) who obtained a sixty percent yield of dimethyl nitromalonate by adding fuming nitric acid slowly to dimethyl malonate cooled to zero degrees centigrade, maintaining this temperature during the addition of fuming nitric acid, removing the cooling means for one-half hour during which time the reaction temperature rose to thirty degrees centigrade, cooling the reaction mixture to zero degrees centigrade for an additional two and one-half hours, quenching the reaction by pouring the nitration mixture into water, and isolating the dimethyl nitromalonate thus produced. The method of the present invention, by employing higher temperatures during addition of the fuming nitric acid to the dialkyl nitromalonate, and throughout the reaction, is productive of a yield of desired dialkyl nitromalonate of about ninety percent, a fifty percent increase over that of Arndt and Rose.

It is well known in the nitration art that in many nitrations there is a maximum temperature above which a reaction cannot be allowed to rise during the course of the nitration, since above such maximum the reaction becomes explosively violent. As large quantities of nitromalonic esters were desired, a small scale experiment was conducted in order to determine the temperature at which a mixture of fuming nitric acid and malonic ester would become uncontrollable. It was unexpectedly found that when small quantities of a dialkyl malonate and fuming nitric acid were mixed at zero degrees centigrade, and then allowed to warm spontaneously, the reaction temperature rose to about fifty degrees centigrade and then began to fall. The experiment was repeated using larger quantities of the reactants and the same results were obtained. This observation, that a nitration using fuming nitric acid and a dialkyl ester of malonic acid can be conducted at much higher temperatures than had been used previously and without fear of a dangerous explosion, led to a further investigation of the effect of temperature upon the nitration of esters of malonic acid.

It was found that when the reaction temperature is kept between about fifteen and twenty degrees centigrade during the addition of fuming nitric acid to a dialkyl malonate, and the reaction temperature is maintained at that temperature for a total period of about four hours, about ninety percent yields of dialkyl nitromalonates are obtained. When the reaction temperature is increased to about twenty-five to thirty degrees centigrade and the total reaction time is about three and one-half hours, an 89.5 percent yield is obtained. When the reaction temperature is maintained between forty-five and fifty degrees centigrade during the addition of the reactants and for a short time thereafter, the total reaction time being fifty minutes, an eighty-nine percent yield is obtained. The time at which the reaction can be maintained at elevated temperatures, particularly those temperatures above about forty degrees centigrade, appears to be critical, as when the nitration is conducted at temperatures between forty and fifty degrees centigrade and the reaction mixture maintained at that temperature for four hours, the yield of dialkyl nitromalonate is reduced to about seventy-five percent.

It is to be understood that the starting dialkyl malonate esters for the process of the present invention include the dimethyl, diethyl, dipropyl, diisopropyl, dibutyl, diamyl, dihexyl, diheptyl, dioctyl and isomeric dialkyl esters of malonic acid, in each case the process resulting in production of the corresponding dialkyl nitromalonate. It is also to be understood that, alternative to mixing the starting reactants at about fifteen to fifty degrees centigrade, the reactants may be admixed at zero degrees centigrade and the reaction mixture thereafter maintained at fifteen to fifty degrees centigrade for periods of fifty minutes to four hours, the reaction time varying inversely with the temperature employed, in which case the yield of desired product is substantially the same as where the higher temperature is employed during admixture. However, it is to be understood that for practical reasons of operation, and to avoid the necessity of large scale refrigeration, the use of higher temperatures during admixture is preferred.

The invention is more specifically described in the following examples, which however are not to be construed as limiting.

Example 1

To eighty grams of diethyl malonate cooled to fifteen degrees centigrade was added 184 milliliters of fuming nitric acid at a uniform rate over a period of one hour while maintaining the temperature at fifteen to twenty degrees centigrade. The mixture was stirred for an additional three and one-half hours at fifteen to twenty degrees centigrade, poured onto one liter of crushed ice, and extracted with 200-milliliter and 100-milliliter portions of toluene. The organic extracts were combined, washed two times with equal volumes of water and with 200-milliliter portions of five percent aqueous urea solution until a starch-iodide test indicated that all of the oxides of nitrogen had been removed. The washed solution was then extracted with equal volumes of ten percent sodium carbonate solution until acidification of a test extraction showed that all of the nitro ester had been removed. The aqueous extracts were then combined, washed once with 200 milliliters of toluene, acidified to pH 4 with hydrochloric acid and ice, and the liberated nitro ester removed by extraction with 500-, 200-, and 100-milliliter portions of toluene. The organic extract was then washed with equal volumes of water, five percent urea solution, and dried. Upon removal of the solvent and distillation of the residue under reduced pressure, there was obtained 94.1 grams (91.7 percent of theory) of pure diethyl nitromalonate, boiling at 81 to 83 degrees centigrade at 0.3 millimeter of mercury pressure absolute, and having an index of refraction $n_D^{21}=1.4274$.

Example 2

The same quantities of reactants were used as in Example 1. The temperature was maintained at between twenty-five and thirty degrees centigrade during addition of the fuming nitric acid to the diethyl malonate, which addition required one hour, and for an additional two and three-quarter hours, whereafter the product was isolated as in Example 1. There was thus obtained 91.3 grams of diethyl nitromalonate, a yield of 89.5 percent.

Example 3

The quantities of reactants were the same as those in Example 1. The reaction temperature was maintained between forty-five and fifty degrees centigrade during the addition of the fuming nitric acid to the diethyl malonate, which required about forty minutes, and for an additional ten minutes, whereafter the reaction product was poured into ice water and isolated as in Example 1. There was thus obtained 90.6 grams of diethyl nitromalonate, a yield of 89 percent.

Example 4

The quantities of reactants were the same as in Example 1. The reaction temperature was maintained between forty and fifty degrees centigrade during the addition of fuming nitric acid to the diethyl malonate, which required thirty-five minutes. The reaction temperature was maintained between forty and fifty degrees centigrade for one hour and then allowed to drop spontaneously without external cooling for an additional two and one-half hours, whereupon the reaction was quenched by pouring the nitration mixture into ice water. The product was isolated as in Example 1, there being obtained 76.7 grams of diethyl nitromalonate, a yield of 75.3 percent.

Although the foregoing specification comprises preferred embodiments of the invention, it is to be understood that the invention is not limited to the exact details shown and described, and that variations and modifications may be made without departing from the scope of the invention as defined in the appended claims.

Having thus described our invention we claim:

1. In a process for the nitration of dialkyl esters of malonic acid with fuming nitric acid to produce a dialkyl mononitromalonate, the improvement which consists in adding the fuming nitric acid portionwise to the dialkyl malonate at a temperature between about fifteen and fifty degrees centigrade and thereafter maintaining the reaction temperature between such limits, the total reaction time being from about four hours to about fifty minutes, the reaction time varying inversely with the reaction temperature.

2. The method of claim 1 wherein the ester of malonic acid nitrated is the diethyl ester.

3. The method of claim 1 wherein the nitration is conducted at a temperature of between about fifteen and thirty degrees centigrade for a period of about four hours.

4. The method of claim 1 wherein the nitration is conducted at a temperature of about forty-five and fifty degrees centigrade for a period of about fifty minutes.

DAVID I. WEISBLAT.
DOUGLAS A. LYTTLE.

References Cited in the file of this patent

Menke: Rec. trav. Chim., vol. 49, pp. 381 and 382 (1930).

Wahl: Compt. rend., vol. 132, pp. 1050–1053 (1901).